(12) United States Patent
Yao et al.

(10) Patent No.: US 12,387,527 B2
(45) Date of Patent: Aug. 12, 2025

(54) DETECTING FORGED FACIAL IMAGES USING FREQUENCY DOMAIN INFORMATION AND LOCAL CORRELATION

(71) Applicant: Tencent Technology (Shenzhen) Company Limited, Guangdong (CN)

(72) Inventors: Taiping Yao, Shenzhen (CN); Shen Chen, Shenzhen (CN); Yang Chen, Shenzhen (CN); Shouhong Ding, Shenzhen (CN); Jilin Li, Shenzhen (CN); Feiyue Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 485 days.

(21) Appl. No.: 17/991,632

(22) Filed: Nov. 21, 2022

(65) Prior Publication Data

US 2023/0081645 A1    Mar. 16, 2023

Related U.S. Application Data

(63) Continuation of application No. PCT/CN2022/073249, filed on Jan. 21, 2022.

(30) Foreign Application Priority Data

Jan. 28, 2021 (CN) .......................... 202110116762.8

(51) Int. Cl.
*G06V 40/16* (2022.01)
*G06V 10/80* (2022.01)
(52) U.S. Cl.
CPC ............ *G06V 40/171* (2022.01); *G06V 10/80* (2022.01)

(58) Field of Classification Search
CPC ...... G06V 40/171; G06V 10/80; G06V 10/82; G06V 40/16; G06F 18/253
See application file for complete search history.

(56) References Cited

U.S. PATENT DOCUMENTS

2019/0244371 A1    8/2019    Kwan
2020/0380279 A1    12/2020    Yang et al.
(Continued)

FOREIGN PATENT DOCUMENTS

CN    1426760 A    7/2003
CN    105005756 A    10/2015
(Continued)

OTHER PUBLICATIONS

International Search Report and Written Opinion in PCT/CN2022/073249, mailed on Apr. 13, 2022, 8 pages.
(Continued)

*Primary Examiner* — Wesley J Tucker
(74) *Attorney, Agent, or Firm* — ArentFox Schiff LLP

(57) ABSTRACT

An image detection method includes obtaining a facial image, and obtaining a frequency-domain image of the facial image and a spatial-domain feature of the facial image, the frequency-domain image being obtained by performing frequency-domain transformation on the facial image. The spatial-domain feature is obtained by performing feature extraction on the facial image. The method further includes performing feature extraction based on the frequency-domain image, to obtain a frequency-domain feature of the facial image, and fusing the spatial-domain feature and the frequency-domain feature by using an attention fusion network of a facial image detection model, to obtain a fused feature of the facial image. The method further includes obtaining a detection result of the facial image based on the
(Continued)

fused feature, the detection result indicating whether the facial image is a forged facial image.

19 Claims, 8 Drawing Sheets

(56) References Cited

U.S. PATENT DOCUMENTS

| | | | |
|---|---|---|---|
| 2021/0117690 A1* | 4/2021 | Ye | G06V 40/176 |
| 2023/0082906 A1* | 3/2023 | Yao | G06V 10/774 |
| | | | 382/118 |
| 2025/0014390 A1* | 1/2025 | Zou | G06V 10/771 |

FOREIGN PATENT DOCUMENTS

| | | |
|---|---|---|
| CN | 111767828 A | 10/2020 |
| JP | 2017016192 A | 1/2017 |
| JP | 2019509566 A | 4/2019 |
| WO | 2015122183 A1 | 8/2015 |
| WO | 2020217371 A1 | 10/2020 |

OTHER PUBLICATIONS

Japanese Office Action issued Jan. 15, 2024 in Application No. 2023-523654, pp. 1-11.

* cited by examiner

DETECTING FORGED FACIAL IMAGES USING FREQUENCY DOMAIN INFORMATION AND LOCAL CORRELATION

RELATED APPLICATIONS

This application is a continuation of International Application No. PCT/CN2022/073249, entitled "IMAGE DETECTION METHOD, MODEL TRAINING METHOD, DEVICE, MEDIUM, AND PROGRAM PRODUCT," and filed on Jan. 21, 2022, which claims priority to Chinese Patent Application No. 202110116762.8, entitled "FACIAL IMAGE DETECTION METHOD, MODEL TRAINING METHOD, APPARATUS, AND STORAGE MEDIUM" and filed on Jan. 28, 2021. The entire disclosures of the prior applications are hereby incorporated by reference.

FIELD OF THE TECHNOLOGY

This application relates to the field of facial recognition technologies, including an image detection method, a model training method, a device, a medium, and a program product.

BACKGROUND OF THE DISCLOSURE

The deep facial forgery technology promotes the emerging development of entertainment and cultural exchange industry, but also brings a huge potential threat to facial security. Therefore, forged images need to be detected.

In the related art, a face-targeted forged image detection technology performs determining through a specific forged trace of fake content such as a blink pattern or a biological feature, for example, extracts an eye region in a video sequence to obtain an eye sequence, and models the eye sequence combined with a neural network to distinguish whether there is a forged facial image or video.

However, a facial image detection model based on the facial forged trace in the above technology has good performance only for face-changing videos including specific forged traces, and has poor generalization. At the same time, with the maturity of the face-changing technology, a generated forged face gradually has a biological pattern consistent with a real face, so that the detection accuracy of the above method is low.

SUMMARY

Embodiments of this disclosure provide an image detection method, a model training method, a device, a medium, and a program product, which can improve the accuracy of authenticity detection on a facial image.

In an embodiment, an image detection method includes obtaining a facial image, and obtaining a frequency-domain image of the facial image and a spatial-domain feature of the facial image, the frequency-domain image being obtained by performing frequency-domain transformation on the facial image. The spatial-domain feature is obtained by performing feature extraction on the facial image. The method further includes performing feature extraction based on the frequency-domain image, to obtain a frequency-domain feature of the facial image, and fusing the spatial-domain feature and the frequency-domain feature by using an attention fusion network of a facial image detection model, to obtain a fused feature of the facial image. The method further includes obtaining a detection result of the facial image based on the fused feature, the detection result indicating whether the facial image is a forged facial image.

In an embodiment, a model training method includes training a facial image detection model including an attention fusion network, a forged facial image determining network, and a decoder, the attention fusion network being configured to generate a fused feature of a facial image based on a spatial-domain feature and a frequency-domain feature of the facial image. The method includes obtaining an image sample set, the image sample set including at least two facial image sample pairs, each of the facial image sample pairs including a facial image positive sample and a facial image negative sample. Each of the facial image samples has a corresponding facial image sample label, and the facial image sample label includes a real facial label or a forged facial label. The method further includes training the facial image detection model by using at least one image in the image sample set, including performing frequency-domain transformation on the at least one image of the image sample set, to obtain a frequency-domain image of the facial image. The training the facial image detection model further includes performing feature extraction based on the at least one image of the image sample set, to obtain the spatial-domain feature of the at least one image of the image sample set, and performing feature extraction based on the frequency-domain image, to obtain the frequency-domain feature of the at least one image of the image sample set. The training the facial image detection model further includes fusing the spatial-domain feature and the frequency-domain feature by using the attention fusion network, to obtain the fused feature of the at least one image of the image sample set, and obtaining a detection result of the at least one image of the image sample set based on the fused feature, the detection result indicating whether the at least one image of the image sample set is a forged facial image.

In an embodiment, an image detection apparatus includes processing circuitry configured to obtain a facial image, and obtain a frequency-domain image of the facial image and a spatial-domain feature of the facial image. The frequency-domain image is obtained by performing frequency-domain transformation on the facial image, and the spatial-domain feature is obtained by performing feature extraction on the facial image. The processing circuitry is further configured to perform feature extraction based on the frequency-domain image, to obtain a frequency-domain feature of the facial image, and fuse the spatial-domain feature and the frequency-domain feature by using an attention fusion network of a facial image detection model, to obtain a fused feature of the facial image. The processing circuitry is further configured to obtain a detection result of the facial image based on the fused feature, the detection result indicating whether the facial image is a forged facial image.

Feature information of a target facial image on a spatial domain and a frequency domain is obtained, a fused feature of the target facial image is obtained according to the feature information of the target facial image on the spatial domain and the frequency domain, and forged facial recognition is performed on the target facial image based on the fused feature. In this way, in a process of detecting the facial image, features of the image on the spatial domain and the frequency domain are comprehensively considered, and the feature information of the two is also fused to obtain the fused feature of the facial image, so that the obtained fused feature of the target facial image is more accurate, and then a detection result of the target facial image obtained by using the fused feature is more accurate.

It is to be understood that the foregoing general descriptions and the following detailed descriptions are merely for illustration and explanation purposes and are not intended to limit this disclosure.

DESCRIPTION OF EMBODIMENTS

Figure 1:
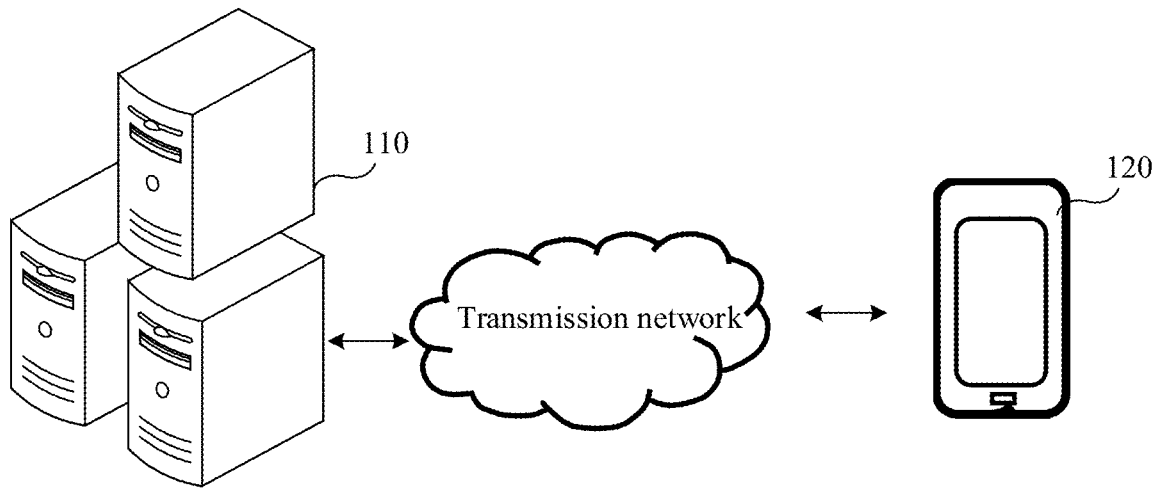
FIG. 1 is a schematic diagram of an image detection system according to an exemplary embodiment of this disclosure.

FIG. 1 is a schematic diagram of an image detection system according to an exemplary embodiment of this disclosure. As shown in FIG. 1, the system includes a server 110 and a terminal 120.

The server 110 may be an independent physical server, or may be a server cluster including a plurality of physical servers or a distributed system.

The terminal 120 may be a terminal having a facial image detection function, for example, the terminal 120 may be a mobile phone, a tablet computer, an e-book reader, smart glasses, a smartwatch, an intelligent television, a smart in-vehicle device, a moving picture experts group audio layer III (MP3) player, a moving picture experts group audio layer IV (MP4) player, a laptop portable computer, a desktop computer, or the like.

In an embodiment, the system includes one or more servers 110, and a plurality of terminals 120. Quantities of servers 110 and terminals 120 are not limited in the embodiments of this disclosure.

The terminal is connected to the server by a communication network. Optionally, the communication network is a wired network or a wireless network.

In an embodiment, the wireless network or the wired network uses a standard communication technology and/or protocol. The network is usually the Internet, but may alternatively be any other networks, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats such as the hypertext markup language (HTML) and the extensible markup language (XML) are used for representing data exchanged through the network. In addition, all or some links may be encrypted by using encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the foregoing data communication technologies. This is not limited in this disclosure.

Figure 2:
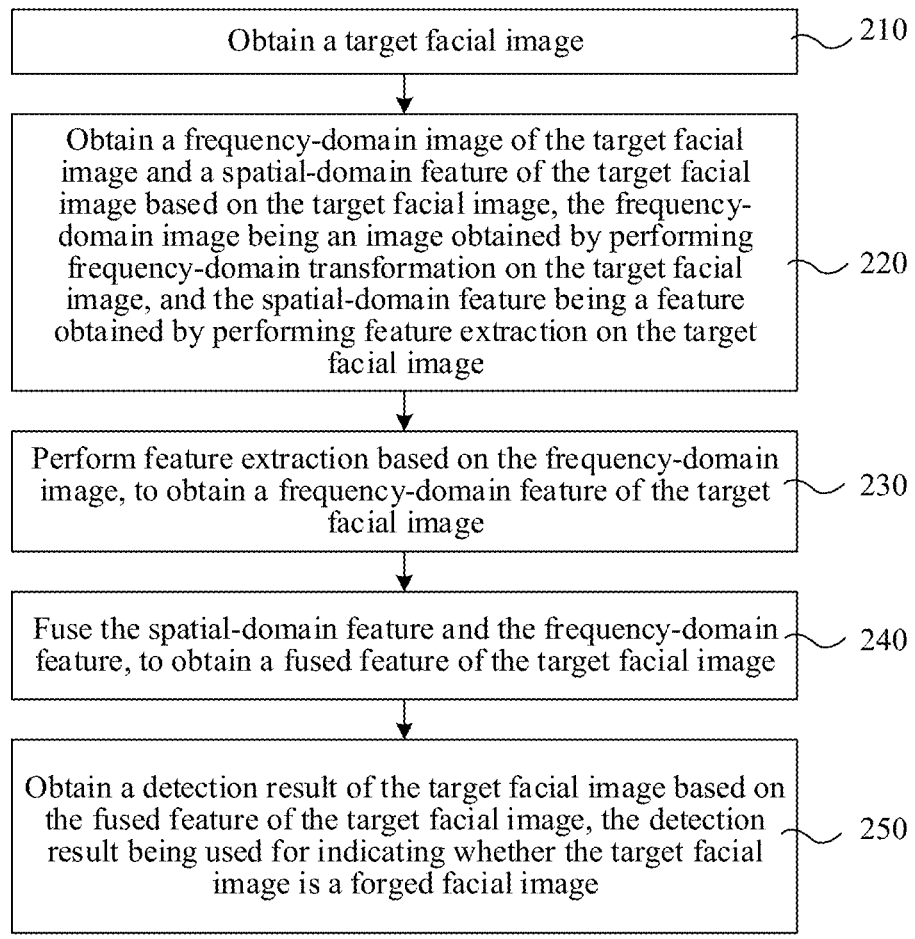
FIG. 2 is a flowchart of an image detection method according to an exemplary embodiment of this disclosure.

FIG. 2 is a flowchart of an image detection method according to an exemplary embodiment of this disclosure. The method is performed by a computer device, and the computer device may be implemented as a terminal or a server. The terminal or the server may be the terminal 120 or the server 110 shown in FIG. 1. As shown in FIG. 2, the image detection method includes the following steps.

Step 210. Obtain a target facial image. For example, a facial image is obtained.

The target facial image may be a static image including a face, or may be a dynamic image including a face. When the target facial image is a static image, the target facial image may be a video frame image including a face obtained from a video, or may be a facial image obtained by an image acquisition device of the terminal, or may be a facial image stored locally by the computer device, or the like. When the target facial image is a dynamic image, the target facial image may be a dynamic image including continuous facial images captured from a video, or may be a dynamic image including a face stored locally by the computer device, or the like. The obtaining manner and the type of the target facial image are not limited in this disclosure.

In a possible implementation, the computer device may obtain one or more target facial images.

For example, when the computer device determines a forgery probability of a face appearing in a video, to improve the accuracy of detecting whether the face in the video is a forged face, the computer device may sample video frames in the video for a plurality of times, to obtain a plurality of facial images including the face, and then determine whether a facial video corresponding to the plurality of facial images is a forged facial video based on a detection result of detecting whether the plurality of facial images are forged facial images.

In response to a detection object of the facial images being the facial video, for the input facial video, the video frames of the facial video may be sampled at equal intervals through an Open Source Computer Vision Library (OpenCV), to obtain a plurality of facial images in the facial video, where facial images in different video frames of the same video may be facial images with different identity labels.

Step 220. Obtain a frequency-domain image of the target facial image and a spatial-domain feature of the target facial image based on the target facial image, the frequency-domain image being an image obtained by performing frequency-domain transformation on the target facial image, and the spatial-domain feature being a feature obtained by performing feature extraction on the target facial image. For example, a frequency-domain image of the facial image and a spatial-domain feature of the facial image are obtained. The frequency-domain image is obtained by performing frequency-domain transformation on the facial image, and the spatial-domain feature is obtained by performing feature extraction on the facial image.

In a possible implementation, the computer device performs frequency-domain transformation on the target facial image, to obtain the frequency-domain image of the target facial image; and the computer device performs feature extraction based on the target facial image, to obtain the spatial-domain feature of the target facial image.

Because an image is represented as pixels on a spatial domain and these pixels are equivalent to discrete two-dimensional signals, the discrete two-dimensional signals need to be converted into amplitude changes on two-dimensional coordinates by using the frequency-domain transformation method when the spatial domain is converted into a frequency domain. Therefore, frequency-domain transformation needs to be performed on the target facial image to obtain the frequency-domain image of the target facial image.

The spatial domain is also referred to as image space, which is space formed by image pixels. Processing pixel values in image space with a length (distance) as an independent variable is referred to as spatial-domain processing. The frequency domain refers to describing features of the image with a frequency (wavenumber) as an independent variable, and can decompose spatial changes of pixel values of an expected image into linear superposition of simple vibration functions with different amplitudes, spatial frequencies, and phases. The composition and distribution of various frequency components in the image are referred to as a spatial spectrum. The decomposition, processing, and analysis of frequency features of the image are referred to as frequency-domain processing or wavenumber-domain processing.

The frequency-domain processing is mainly used in processing and analysis related to image space frequencies, such as image restoration, image reconstruction, radiation transformation, edge enhancement, image sharpening, image smoothing, noise suppression, spectrum analysis, and texture analysis.

The spatial domain in the embodiments of this disclosure represents a spatial domain, and the frequency domain represents a frequency domain.

In this embodiment of this disclosure, the computer device performs feature extraction on the target facial image, and may obtain the spatial-domain feature of the target facial image.

Step 230. Perform feature extraction based on the frequency-domain image, to obtain a frequency-domain feature of the target facial image. For example, feature extraction is performed based on the frequency-domain image, to obtain a frequency-domain feature of the facial image.

The spatial domain and the frequency domain provide different perspectives for obtaining image information. In the spatial domain, an image f(x, y) is a discrete function defined on a rectangular region in two-dimensional space. If f(x, y) is regarded as an Erwin signal whose amplitude changes, the image may be processed in the frequency domain by using the frequency-domain transformation method, so as to obtain more prominent characteristics of the image in the frequency domain.

The frequency-domain transformation method may include Fourier transformation, discrete cosine transformation, Walsh transformation, wavelet transformation, and the like.

Step 240. Fuse the spatial-domain feature and the frequency-domain feature, to obtain a fused feature of the target facial image. For example, the spatial-domain feature and the frequency-domain feature are fused by using an attention fusion network of a facial image detection model, to obtain a fused feature of the facial image.

Step 250. Obtain a detection result of the target facial image based on the fused feature of the target facial image, the detection result being used for indicating whether the target facial image is a forged facial image. For example, a detection result of the facial image is obtained based on the fused feature. The detection result indicates whether the facial image is a forged facial image.

A face in a forged facial image may be a face that has been replaced, for example, a face after replacing all or part of facial features. In this embodiment of this disclosure, the forged facial image is a facial image formed after a face in an original facial image corresponding to the forged facial image is replaced and a background in the original facial image remains unchanged. The forged facial image may be represented as facial editing, expression editing, and the like.

In an embodiment, the forged facial image is a forged facial image generated based on an AI face changing technology.

The method provided in this disclosure may detect whether a face in a static facial image is a forged face, and may also detect whether a face in a video or dynamic facial image is a forged face.

In summary, according to the image detection method provided in this embodiment of this disclosure, feature information of a target facial image on a spatial domain and a frequency domain is obtained, a fused feature of the target facial image is obtained according to the feature information of the target facial image on the spatial domain and the frequency domain, and forged facial recognition is performed on the target facial image based on the fused feature. In this way, in a process of detecting the facial image, features of the image on the spatial domain and the frequency domain are comprehensively considered, and the feature information of the two is also fused to obtain the fused feature of the facial image, so that the obtained fused feature of the target facial image is more accurate, and then a detection result of the target facial image obtained by using the fused feature is more accurate.

In the solution provided in this embodiment of this disclosure, the computer device can obtain a fused feature of a facial image based on a spatial-domain feature and a frequency-domain feature of the same facial image, and determine whether the facial image is a forged facial image based on the fused feature, thereby improving the accuracy of detecting authenticity of the facial image. The above solution may be applied to scenarios such as, verifying a user identity through facial recognition, and authenticating a picture and a video.

For example, the application scenarios of the above solution include but are not limited to the following:

1. Scenario of a Virtual Resource Replacement Industry.

For example, in a scenario of virtual resource replacement service processing, when a user needs to transfer a large amount of virtual resources, to ensure the security of virtual resource replacement and verify the user's identity, a facial image or facial video of the user needs to be obtained and detected in real time. In this case, if a user who does not support a virtual resource transfer operation processes the facial image or facial video and then pretends to be a user who supports the virtual resource transfer operation to perform false identity information verification, and the computer device does not accurately detect that the facial image is a forged facial image, risks are brought to the user. In this case, through the facial image detection method provided in this disclosure, one or more images in the facial image or facial video of the user for identity verification are obtained as a target facial image; frequency-domain transformation is performed on the target facial image, to obtain a frequency-domain image of the target facial image; a spatial-domain feature and a frequency-domain feature of the target facial image are respectively extracted based on the target facial image and the frequency-domain image, and then the spatial-domain feature and the frequency-domain feature are fused to obtain a fused feature of the target facial image; and it is verified whether the target facial image is a forged facial image based on the fused feature, to determine authenticity of the facial image or facial video uploaded by the user. When a detection result indicates that the facial image in the facial image or facial video is a real facial image, that is, it is determined that the facial image or facial video is a real image or real video, identity verification is performed on a user identity in the facial image or facial video, thereby ensuring the security of virtual resources of the user.

2. Scenario of Network Friend Making.

Online friend making has become an important means of current social networking. During network friend making, the replacement of facial images or facial videos through a facial forgery technology increases the fun of network friend making. For example, face-changing operations can be realized by face-changing technologies such as Deepfakes, but the authenticity of network friend making is lower. To realize verification of authenticity of a facial image of an online friend or a facial image in a real-time online video in a process of network friend making, the authenticity of the obtained facial image or real-time online video in the process of network friend making is detected by the facial image detection method provided in this disclosure. After the current facial image or facial video is a forged facial image or facial video, a forged prompt sign may be displayed on the facial image or facial video, for example, adding a forged facial watermark, so as to feed back real information to users while keeping the fun of online friend making.

Figure 3:
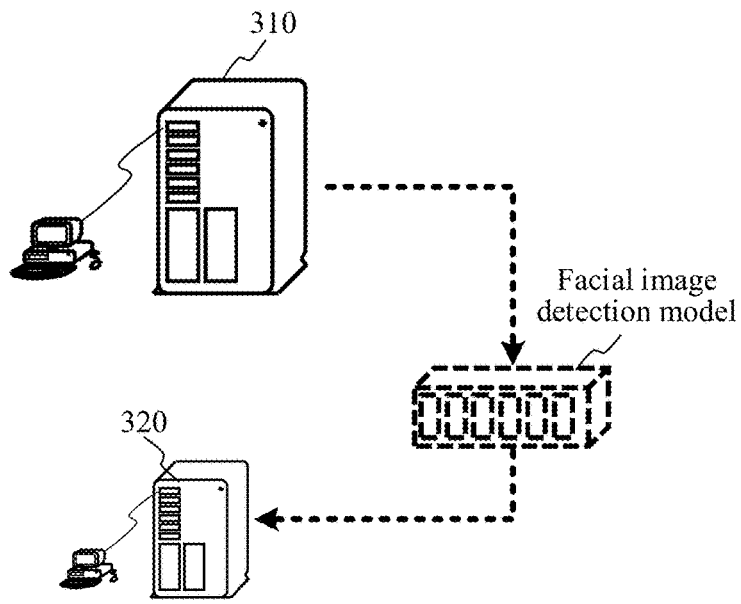
FIG. 3 is a framework diagram of facial image detection model training and facial image detection according to an exemplary embodiment.

The solutions involved in this disclosure include a facial image detection model training stage and a facial image detection stage. FIG. 3 is a framework diagram of facial image detection model training and facial image detection according to an exemplary embodiment. As shown in FIG. 3, in the facial image detection model training stage, a facial image detection model training device 310 obtains a facial image detection model through preset training samples (including an image sample set and training labels, where the training labels include image sample labels of facial image samples, a forged facial region image, and a real local region similarity set of the forged facial region image). In the facial image detection stage, a facial image detection device 320 performs forged facial image probability detection on an inputted target facial image based on the facial image detection model, to determine whether the target facial image is a forged facial image.

The facial image detection model training device 310 and the facial image detection device 320 may be computer devices. For example, the computer devices may be stationary computer devices such as a personal computer and a server, or the computer devices may be mobile computer devices such as a tablet computer and an e-book reader.

The facial image detection model training device 310 and the facial image detection device 320 may be the same device; or, the facial image detection model training device 310 and the facial image detection device 320 may be different devices. In addition, when the facial image detection model training device 310 and the facial image detection device 320 are different devices, the facial image detection model training device 310 and the facial image detection device 320 may be devices of a same type, for example, the facial image detection model training device 310 and the facial image detection device 320 may be servers; or, the facial image detection model training device 310 and the facial image detection device 320 may be devices of different types, for example, the facial image detection model training device 310 may be a personal computer or terminal, and the facial image detection device 320 may be a server. Specific types of the facial image detection model training device 310 and the facial image detection device 320 are not limited in the embodiments of this disclosure.

Figure 4:
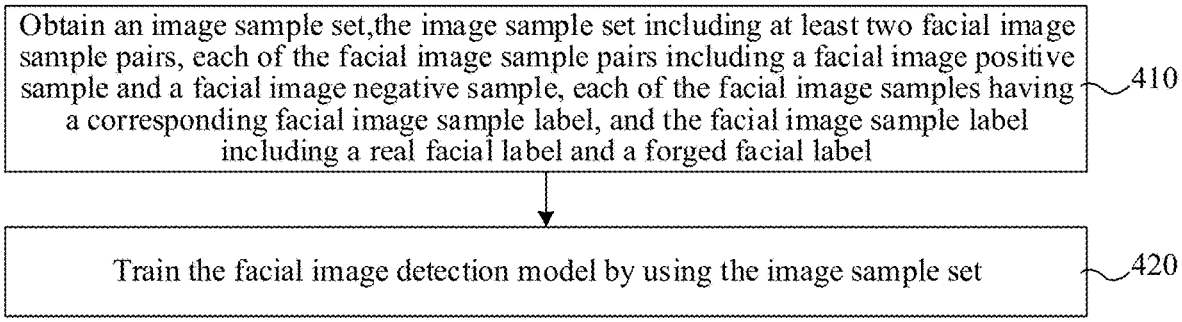
FIG. 4 is a flowchart of a facial image detection model training method according to an exemplary embodiment of this disclosure.

FIG. 4 is a flowchart of a facial image detection model training method according to an exemplary embodiment of this disclosure. A facial image detection model includes: an attention fusion network, a forged facial image determining network, and a decoder, the attention fusion network being configured to obtain a fused feature of a facial image based on a spatial-domain feature and a frequency-domain feature of the facial image. The method may be performed by a computer device, and the computer device may be implemented as a terminal or a server. The terminal or the server may be the terminal or the server shown in FIG. 1. As shown in FIG. 4, the facial image detection model training method includes the following steps.

Step 410. Obtain an image sample set, the image sample set including at least two facial image sample pairs, each of the facial image sample pairs including a facial image positive sample and a facial image negative sample, each of the facial image samples having a corresponding facial image sample label, and the facial image sample label including a real facial label and a forged facial label.

In a possible implementation, the image sample set includes a facial image positive sample set and a facial image negative sample set.

Facial image positive samples in the facial image positive sample set may represent real facial image samples, and facial image negative samples in the facial image negative sample set may represent forged facial image samples. The real facial image samples in the facial image positive sample set and the forged facial image samples in the facial image negative sample set correspond one by one, and the real facial image samples in the facial image positive sample set and the corresponding forged facial image samples in the facial image negative sample set form one group of facial image sample pairs.

In a possible implementation, when obtaining a facial image sample, the computer device may obtain a video frame including a face in a video as the facial image sample, and the process is implemented as follows: obtaining a facial video, where the facial video is a video including a facial image; sampling the facial video, to obtain a facial video frame, where the facial video frame is used for indicating the video frame including the face in the video; and performing facial detection on the video frame, to obtain a facial region in the video frame, and obtaining the facial image sample based on the facial region.

Most of face-changing video data sets used as samples have category imbalance, that is, a quantity of forged videos is often more than a quantity of real videos. Therefore, when obtaining a facial video corresponding to a facial image sample, the facial video may be obtained in a down-sampling manner, that is, one forged video is sampled from all forged videos corresponding to each real video, so as to ensure the balance of positive and negative sample sources in a training sample set. That is, for each real facial video, when acquiring an image sample, only one corresponding forged facial video is obtained to acquire a facial image negative sample.

In the process of acquiring the sample image, the computer device may sample N frames at equal intervals from facial image video frames included in each video according to a frame sequence of the real facial video and the forged facial video, to form a facial image positive sample set and a facial image negative sample set in the training sample set.

In a possible implementation, 0 and 1 represent facial image sample labels.

For example, 0 indicates that a facial image sample label is a real facial label, and 1 indicates that a facial image sample label is a forged facial label.

Step 420. Train the facial image detection model by using the image sample set, where the facial image detection model may be configured to perform the following operations: obtaining a target facial image; performing frequency-domain transformation on the target facial image, to obtain a frequency-domain image of the target facial image; performing feature extraction based on the target facial image, to obtain a spatial-domain feature of the target facial image; performing feature extraction based on the frequency-domain image, to obtain a frequency-domain feature of the target facial image; fusing the spatial-domain feature and the frequency-domain feature, to obtain a fused feature of the target facial image; and obtaining a detection result of the target facial image based on the fused feature of the target facial image, the detection result being used for indicating whether the target facial image is a forged facial image.

The forged facial image determining network may be configured to determine whether the target facial image is a forged facial image, and the decoder may be configured to generate a forged facial region image in the target facial image.

In summary, according to the facial image detection model training method provided in this embodiment of this disclosure, a facial image detection model including an attention fusion network, a forged facial image determining network, and a decoder is obtained based on an image sample set. In this way, in a process of detecting a facial image, features of the facial image on a spatial domain and a frequency domain are comprehensively considered by using the facial image detection model, and feature information of the two is also fused to obtain a fused feature of the facial image, so that the obtained fused feature of a target facial image is more accurate, and then a detection result of the target facial image obtained by using the fused feature is more accurate.

Figure 5:
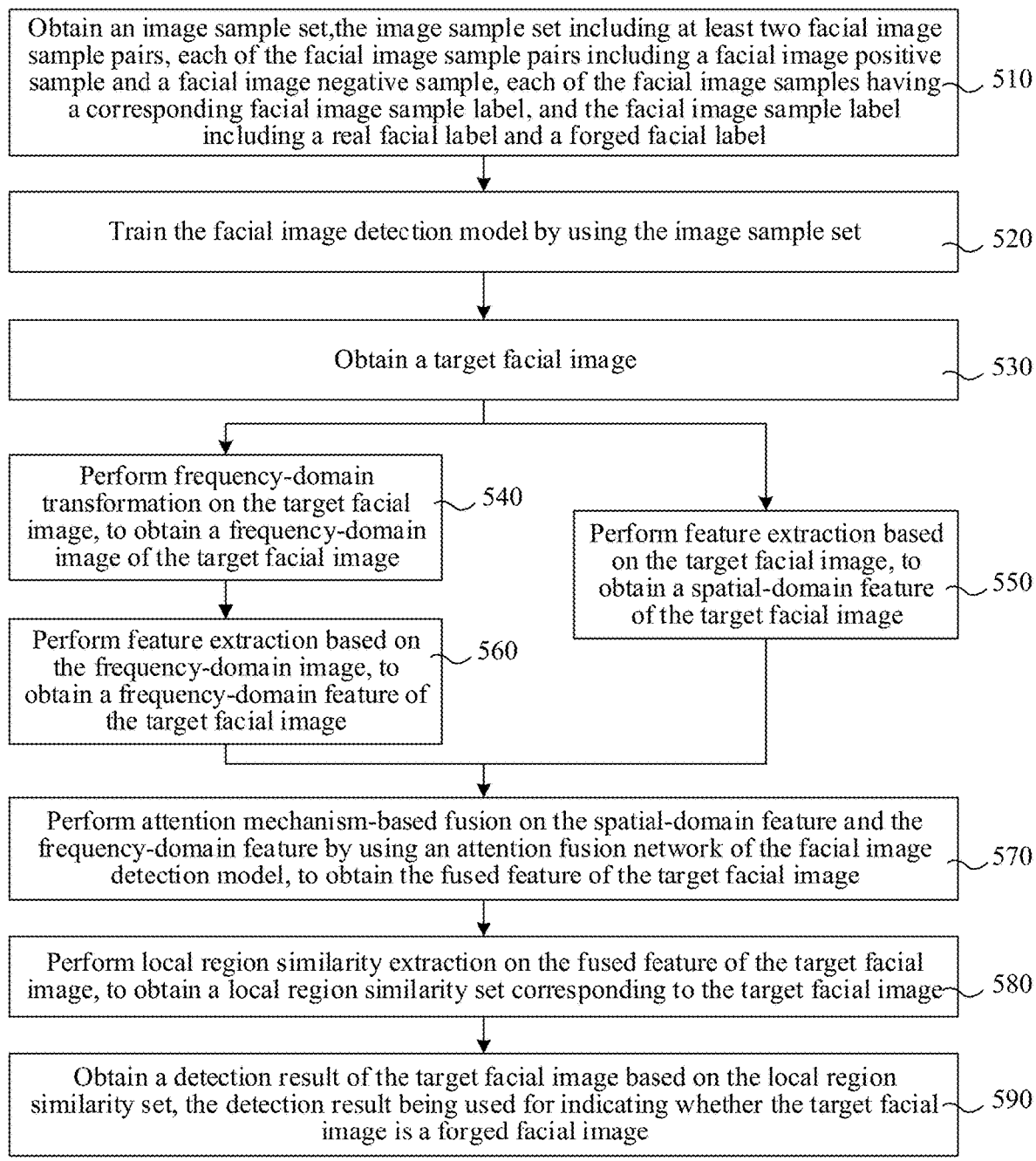
FIG. 5 is a flowchart of a facial image detection model training and facial image detection method according to an exemplary embodiment of this disclosure.

FIG. 5 is a flowchart of a facial image detection model training and facial image detection method according to an exemplary embodiment of this disclosure. The method is performed by a computer device, and the computer device may be implemented as a terminal or a server. The terminal or the server may be the terminal or server of the system shown in FIG. 1. As shown in FIG. 5, the facial image detection model training and facial image detection method includes the following steps.

Step 510. Obtain an image sample set, the image sample set including at least two facial image sample pairs, each of the facial image sample pairs including a facial image positive sample and a facial image negative sample, each of the facial image samples having a corresponding facial image sample label, and the facial image sample label including a real facial label and a forged facial label. For example, an image sample set is obtained, the image sample set including at least two facial image sample pairs, each of the facial image sample pairs including a facial image positive sample and a facial image negative sample. Each of the facial image samples has a corresponding facial image sample label, and the facial image sample label being a real facial label or a forged facial label.

Step 520. Train the facial image detection model by using the image sample set.

In a possible implementation, the computer device may randomly sample B facial image samples and forged facial region images corresponding to the B facial image samples from a training set based on a mini-batch method, where the forged facial region images are forged region images corresponding to the facial image samples obtained based on the facial image sample pairs, the facial image samples may include facial image positive samples and facial image negative samples, and data enchantment processing is performed on the sampled facial image samples and the corresponding forged facial region images.

For example, the computer device may process the facial image samples and the forged facial region images through operations such as random flipping, blurring, and JPEG compression, and train the facial image detection model based on the processed facial image samples and forged facial region images.

In a process of training the facial image detection model, the method may further include the following steps:

S521. Obtain, based on the at least two facial image sample pairs in the image sample set, forged facial region images corresponding to each of the facial image sample pairs.

In this embodiment of this disclosure, a forged facial region is a region in a facial image positive sample and a facial image negative sample that is different from a real facial image.

Because the facial image positive sample and the real facial image has no difference, all pixel values of the forged facial region image corresponding to the facial image positive sample may be 0.

In a possible implementation, for a forged facial region of the facial image negative sample, the forged facial region of the facial image negative sample may be obtained through pixel differences between the facial image positive sample and the facial image negative sample that correspond to each other.

Figure 6:
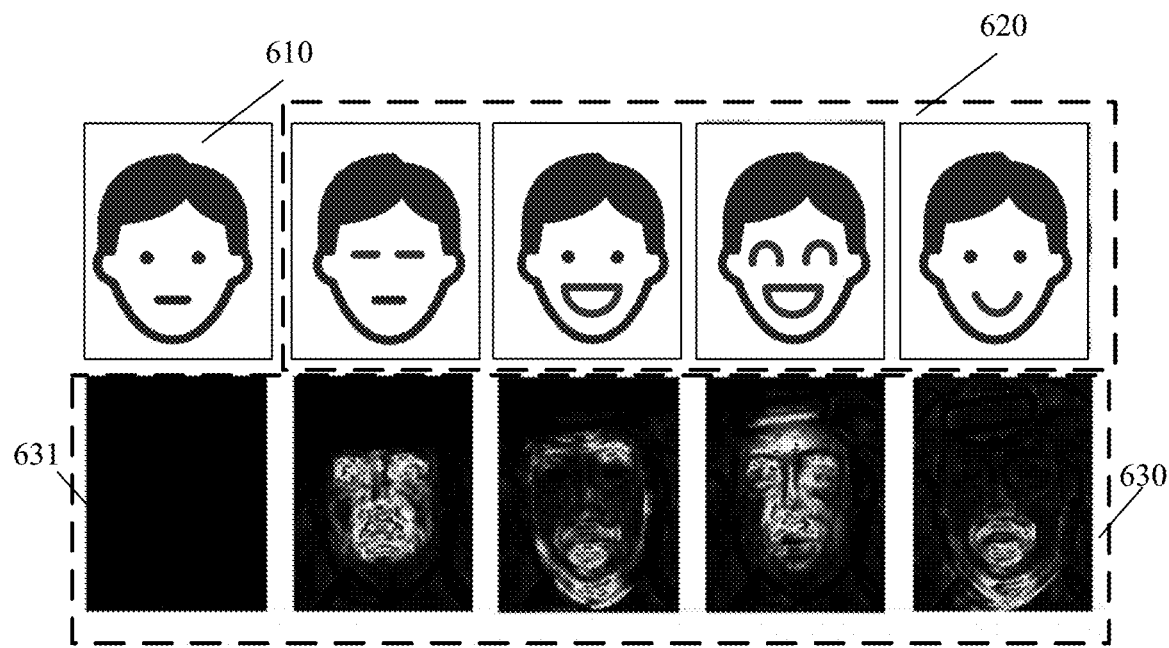
FIG. 6 is a schematic diagram of a facial image sample according to an exemplary embodiment of this disclosure.

For example, FIG. 6 is a schematic diagram of a facial image sample according to an exemplary embodiment of this disclosure. As shown in FIG. 6, a facial image 610 is a facial image positive sample, namely, a real facial image, and a facial image in a facial image set 620 is a facial image negative sample of the facial image 610. A forged facial region may be obtained based on pixel differences between the facial image positive sample and the facial image negative sample, and an obtained forged facial region image may be a forged facial region image shown in a forged facial region image set 630.

A real part in the facial image sample, namely, a pixel part of the facial image sample same as the real facial image, may be represented as 0. A forged part in the facial image sample, namely, a pixel part of the facial image sample different from the real facial image, may be represented as 1.

Because the facial image positive sample and the real facial image has no difference, all pixel values of the forged facial region image corresponding to the facial image positive sample may be set to 0, which corresponds to a forged facial region image 631 in FIG. 6.

S522. Obtain a real local region similarity set of each of the forged facial region images.

The process may be implemented as follows: the computer device performs region division on each of the forged facial region images, to obtain at least two regions corresponding to each of the forged facial region images; the computer device obtains proportions of forged facial areas respectively corresponding to the at least two regions; and the computer device obtains a set of Euclidean distances between each of the regions and another of the regions based on the proportions of the forged facial areas respectively corresponding to the regions, and obtains the real local region similarity set of each of the forged facial region images.

The calculation for a proportion of a forged facial area may implemented as follows: the computer device may obtain a quantity of forged pixels in each of the regions, and then obtain a proportion of the quantity of forged pixels in each of the regions from a quantity of total pixels in the corresponding region as the proportion of the forged facial area corresponding to each of the regions.

In a possible implementation, the computer device performs region division on a facial image sample at equal intervals.

For example, the computer device may divide a facial image sample into 5×5 regions, and then calculate a Euclidean distance between each of the regions and another of the regions by using a proportion of a forged facial area corresponding to each of the regions.

The Euclidean distance between each of the regions and another of the region is a Euclidean distance between the proportion of the forged facial area corresponding to each of the regions and a ratio of a forged facial area corresponding to another of the regions. The calculation formula may be:

$$d_{ij}=\sqrt{(p_i-p_j)^2}$$

where, $d_{ij}$ represents a Euclidean distance, $p_i$ represents a proportion of a forged facial area corresponding to an $i^{th}$ region, and $p_j$ represents a proportion of a forged facial area corresponding to a $j^{th}$ region.

For example, if the proportion of the forged facial area of the $i^{th}$ region is 0.25 and the proportion of the forged facial area of the $j^{th}$ region is 0.5, a Euclidean distance between the $i^{th}$ region and the $j^{th}$ region may be ¼.

A real local region similarity may be a matrix obtained based on the calculation of the Euclidean distance between each of the regions and another of the regions.

For example, a value of an $i^{th}$ row and a $j^{th}$ column of the matrix represents a similarity distance between an $i^{th}$ region and a $j^{th}$ region, where the calculation formula of the real local region similarity is:

$$S_{ij}=1-d_{ij}$$

where, $S_{ij}$ represents a real local region similarity between the $i^{th}$ region and the $j^{th}$ region.

S523. Train the facial image detection model based on the facial image samples and a training label corresponding to each of the facial image samples, where the training label includes the facial image sample label, the forged facial region image, and the real local region similarity set of the forged facial region image.

In a possible implementation, the process may be implemented as follows: the computer device inputs each of the facial image samples in the image sample set into the facial image detection model, to obtain a prediction result corresponding to each of the facial image samples, where the prediction result includes a predicted facial image sample label, a predicted forged facial region image, and a predicted local region similarity; the computer device calculates a loss function based on the training labels corresponding to the facial image samples and the prediction results corresponding to the facial image samples; and the computer device performs parameter updating on the facial image detection model based on the loss function.

To ensure the accuracy of the facial image detection model detecting a target facial image during application, the prediction result (namely, a predicted detection result) of the facial image detection model based on the facial image sample needs to be the same as or similar to the training label corresponding to the facial image sample in the model training stage; the facial image detection model are trained for a plurality of times in the training process; and model parameters in networks in the facial image detection model are updated until the facial image detection model converges, thereby completing the training of the facial image detection model.

In this embodiment of this disclosure, the loss function may include a binary cross-entropy loss $L_{ce}$ for classification, a segmentation loss $L_{det}$ for a decoder, and a similarity loss $L_{sim}$ for local region similarity learning. A loss value of the facial image detection model is obtained based on a weighted summation of the three losses, and formulas corresponding to the functions are as follows:

$$L_{ce} = y\log\hat{y} + (1-y)\log(1-\hat{y})$$

$$L_{sim} = \|s-\hat{s}\|_2$$

$$L_{det} = \sum_{i,j} M_{ij}\log\hat{M}_{ij} + (1-M_{ij})\log(1-\hat{M}_{ij})$$

$$L_{total} = L_{ce} + \lambda_1 L_{sim} + \lambda_2 L_{det}$$

where, $L_{total}$ represents a loss of the facial image detection model, $y$ and $\hat{y}$ respectively represent a real value and a predicted value of a facial image sample label, s and ŝ respectively represent a real value and a predicted value of a local region similarity, M and $\hat{M}$ respectively represent a real value and a predicted value of a local region similarity set, $M_{ij}$ represents a value of an $i^{th}$ row and a $j^{th}$ column in the local region similarity set, and $\lambda_1$ and $\lambda_2$ are balance coefficients for controlling different loss functions. Values of $\lambda_1$ and $\lambda_2$ may be set and adjusted according to different requirements of model training, for example, the values of $\lambda_1$ and $\lambda_2$ in this embodiment of this disclosure may be set to 10 and 0 respectively.

In a possible implementation, the computer device updates the parameters in the networks in the facial image detection model by an optimization algorithm, and optimize results through a plurality of iterations.

For example, the optimization algorithm may be an Adam algorithm.

In an embodiment, in the process of training the facial image detection model, the computer device has a validation set, and performs model selection and attenuation of a learning rate according to accuracy of the validation set, so as to prevent the facial image detection model from overfitting.

To avoid misjudgment of authenticity of a facial image caused by the facial image detection model directly determining the authenticity of the facial image based on a result of facial recognition, when constructing an image sample set, the computer device may set that different facial image samples and corresponding identity labels do not overlap, so as to avoid a situation in which the facial image detection model directly classifies the facial image as a real face or a forged face after determining that an identity label of the current facial image sample is a specified identity label.

For example, in the model training process, there are a plurality of facial images with an identity label A. During model training, because the computer device determines a facial image 1 with the identity label A as a real facial image when the facial image detection model previously detects, when a facial image 2 with the identity label A is inputted next time, the facial image model may directly determine the facial image as a real facial image.

Step 530. Obtain a target facial image. For example, a facial image is obtained.

The target facial image may be a single facial image or a target facial video including a plurality of facial images. When the target facial image is implemented as the target facial video, the target facial video is sampled to obtain video frame images, for example, the video frames are sampled at equal intervals by using OpenCV to obtain the target facial image.

A quantity of sampled frames of the target facial video may be increased or reduced according to actual requirements, to obtain different quantities of video information. After at least two video frame images are obtained based on the facial video, face regions in the at least two video frame images are recognized and cropped based on a face detection technology, to obtain the target facial image.

For example, the face detection technology may include an MTCNN technology.

In a possible implementation, the computer device expands a facial image obtained by recognition and cropping based on the face detection technology with a facial region as a center, and obtains the expanded facial image as the target facial image.

For example, the computer device may recognize and crop a facial image based on the face detection technology and expand the facial image by 1.2 times, 1.5 times, or 2 times with the facial area as the center, to obtain the target facial image. The above magnifications are only illustrative. This is not limited in this disclosure.

Step 540. Perform frequency-domain transformation on the target facial image, to obtain a frequency-domain image of the target facial image. For example, frequency-domain transformation is performed on the facial image, to obtain a frequency-domain image of the facial image.

In a possible implementation, the computer device realizes a frequency-domain change on the target facial image through discrete cosine transformation.

That is, the computer device converts the target facial image into frequency-domain space through discrete cosine transformation (DCT) (D), and filters (F) low-frequency information of the image, so as to amplify forged traces of the target facial image at high frequencies; and then transform back into the frequency-domain image that is easy to train a convolutional neural network by inverse discrete cosine transformation ($D^{-1}$).

Alternatively, the computer device may also extract the frequency-domain information through discrete Fourier transformation, fast Fourier transformation, or another method, to obtain the frequency-domain image of the target facial image. The manner of obtaining the frequency-domain image of the target facial image is not limited in this disclosure.

Step 550. Perform feature extraction based on the target facial image, to obtain a spatial-domain feature of the target facial image. For example, feature extraction is performed based on the facial image, to obtain the spatial-domain feature of the facial image.

In a possible implementation, the computer device inputs the target facial image into an encoder, and performs feature extraction on the target facial image through a convolutional layer in the encoder, to obtain a high-resolution feature corresponding to the target facial image; and performs down-sampling processing on the high-resolution feature through a pooling layer in the encoder, to obtain the spatial-domain feature of the target facial image.

An order of performing the foregoing step 540 and step 550 is not limited, and may be performed successively, or may be performed synchronously.

Step 560. Perform feature extraction based on the frequency-domain image, to obtain a frequency-domain feature of the target facial image. For example, feature extraction is performed based on the frequency-domain image, to obtain the frequency-domain feature of the facial image.

In a possible implementation, the computer device inputs the frequency-domain image of the target facial image into the encoder, and performs feature extraction on the frequency-domain image through a convolutional layer in the encoder, to obtain a high-resolution feature corresponding to the target facial image; and performs down-sampling processing on the high-resolution feature through a pooling layer in the encoder, to obtain the frequency-domain feature of the target facial image.

Step 570. Perform attention mechanism-based fusion on the spatial-domain feature and the frequency-domain feature by using an attention fusion network of the facial image detection model, to obtain the fused feature of the target facial image. For example, the spatial-domain feature and the frequency-domain feature are fused by using the attention fusion network, to obtain the fused feature of the facial image.

The facial image model is obtained by training a facial image sample and a training label corresponding to the facial image sample. For the process of training the facial image model, reference may be made to related descriptions of step 510 and step 520, and details are not described herein again.

An essence of an attention mechanism is a mechanism that emphasizes a user's region of interest in a "dynamically weighted" manner and suppresses unrelated background regions by using a group of weight coefficients learned autonomously by a network. In the field of computer vision, the attention mechanism may be roughly divided into two types: a strong attention and a soft attention.

The attention mechanism is often used in a recurrent neural network (RNN). Every time some pixels of a target image are processed, the RNN with the attention mechanism performs processing according to some pixels of the target image on which a previous state of a current state focuses rather than all pixels of the target image, so that the processing complexity of the task can be reduced.

The computer device inputs the spatial-domain feature and the frequency-domain feature of the target facial image into the attention fusion network of the facial image detection model, to obtain the fused feature of the target facial image outputted by the attention fusion network. The attention fusion network includes n layers, and n is a positive integer. A process of generating the fused feature of the target facial image includes the following.

The computer device performs, by using the attention fusion network, attention mechanism-based fusion on the spatial-domain feature and the frequency-domain feature at n layers, so that intermediate fused features corresponding to the n layers can be obtained. The computer device splices the intermediate fused features corresponding to the n layers, so that the fused feature of the target facial image can be obtained.

An intermediate fused feature is a feature of the target facial image outputted by a subnetwork of each layer after attention mechanism-based fusion is performed on the spatial-domain feature and the frequency-domain feature through subnetworks of different layers.

That is, an intermediate fused feature is obtained based on a fused spatial-domain feature and a fused frequency-domain feature; and the fused spatial-domain feature is a feature on a spatial domain obtained after performing attention mechanism-based fusion on the spatial-domain feature and the frequency-domain feature, and the fused frequency-domain feature is a feature on a frequency domain obtained after performing attention mechanism-based fusion on the spatial-domain feature and the frequency-domain feature.

In a possible implementation, for a $t^{th}$ layer in the n layers, the computer device inputs, at the $t^{th}$ layer, a fused spatial-domain feature at a $(t-1)^{th}$ layer and a fused frequency-domain feature at the $(t-1)^{th}$ layer into the attention fusion network, to obtain a fused spatial-domain feature at the $t^{th}$ layer and a fused frequency-domain feature at the $t^{th}$ layer; and then splices the fused spatial-domain feature at the $t^{th}$ layer and the fused frequency-domain feature at the $t^{th}$ layer, to generate an intermediate fused feature corresponding to the $t^{th}$ layer.

The $t^{th}$ layer is any one of the n layers, $1 \leq t \leq n$, and both t and n are a positive integer.

That is, for the $t^{th}$ layer, the input thereof includes the fused spatial-domain feature at the $(t-1)^{th}$ layer and the fused frequency-domain feature at the $(t-1)^{th}$ layer. When t=1, the input is the spatial-domain feature extracted based on the target facial image and the frequency-domain feature extracted based on the frequency-domain image corresponding to the target facial image.

Image splicing (Image Mosaic) refers to form a seamless and high-definition image by aligning a series of spatially overlapping images. The image after image splicing has a higher resolution and a larger view than a single image.

That is, the image after image splicing include more image information. The computer device splices the fused spatial-domain feature and the fused frequency-domain feature, to obtain comprehensive information of the target facial image on the spatial domain and the frequency domain, namely, the intermediate fused feature. The computer device splices the intermediate fused features corresponding to the layers, to obtain the fused feature of the target facial image.

In a possible implementation, the attention fusion network includes an attention extraction subnetwork, configured to obtain a spatial-domain attention map corresponding to a spatial domain stream and a frequency-domain attention map corresponding to a frequency domain stream based on the inputted fused spatial-domain feature (the spatial-domain feature) and fused frequency-domain feature (the frequency-domain feature), so as to generate a fused spatial-domain feature of a current layer based on a fused spatial-domain feature at a previous layer and a spatial-domain attention map at the current layer, and generate a fused frequency-domain feature of the current layer based on a fused frequency-domain feature at the previous layer and a frequency-domain attention map at the current layer. The process is implemented as follows:

The computer device inputs, at the $t^{th}$ layer, the fused spatial-domain feature at the $(t-1)^{th}$ layer and the fused frequency-domain feature at the $(t-1)^{th}$ layer into the attention extraction subnetwork of the attention fusion network, to obtain a spatial-domain attention map at the $t^{th}$ layer and a frequency-domain attention map at the $t^{th}$ layer that are outputted by the attention extraction subnetwork; the computer device generates the fused spatial-domain feature at the $t^{th}$ layer based on the fused spatial-domain feature at the $(t-1)^{th}$ layer and the spatial-domain attention map at the $t^{th}$ layer; and the computer device generates the fused frequency-domain feature at the $t^{th}$ layer based on the fused frequency-domain feature at the $(t-1)^{th}$ layer and the frequency-domain attention map at the $t^{th}$ layer.

The spatial-domain attention map may be used for indicating a weight of the fused spatial-domain feature; and the frequency-domain attention map may be used for indicating a weight of the fused frequency-domain feature.

Figure 7:
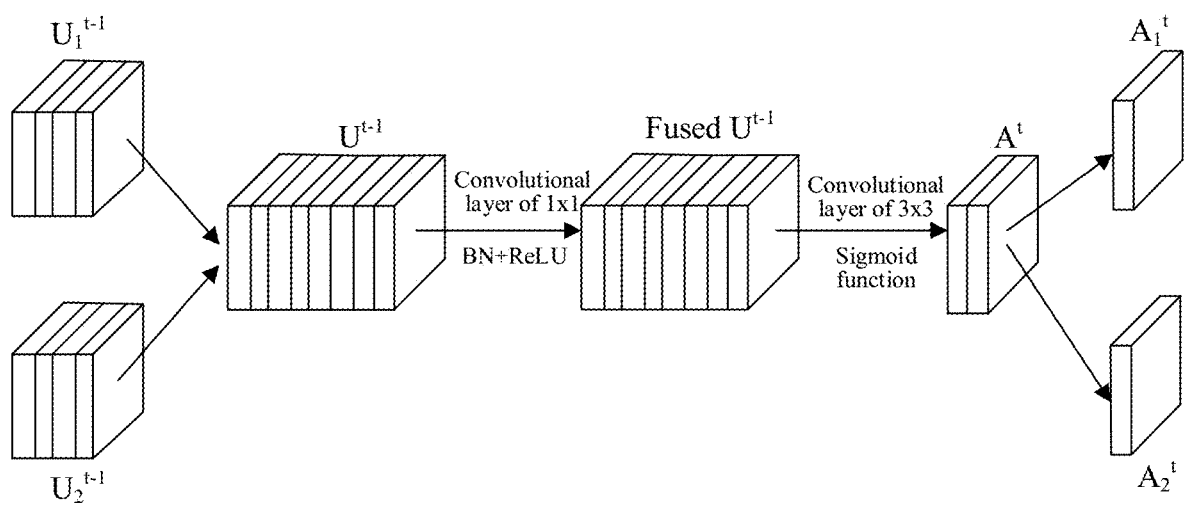
FIG. 7 is a working schematic diagram of an attention extraction subnetwork according to an exemplary embodiment of this disclosure.

Exemplarily, FIG. 7 is a working schematic diagram of an attention extraction subnetwork according to an exemplary embodiment of this disclosure. As shown in FIG. 7, the attention extraction subnetwork includes a convolutional layer ($Conv_{1 \times 1}$) with a kernel size of 1×1, a batch normalization (BN) layer, a rectified linear unit (ReLU) function, a convolutional layer ($Conv_{3 \times 3}$) with 3×3, and a Sigmoid function. When the fused frequency-domain feature (the frequency-domain feature) and the fused spatial-domain feature (the spatial-domain feature) are fused, the frequency-domain feature and the spatial-domain feature may be represented in the form of a feature $A_1^t$ map, and $U_1^{t-1}$ and $U_2^{t-1}$ respectively represent a feature map of the spatial-domain feature at the $(t-1)^{th}$ layer and a feature map of the frequency-domain feature at the $(t-1)^{th}$ layer of the network. After $U_1^{t-1}$ and $U_2^{t-1}$ are spliced together, an intermediate fused feature $U^{t-1}$ at the $(t-1)^{th}$ layer is obtained. Then, the spatial-domain feature and the frequency-domain feature are fused by using the convolutional layer ($Conv_{1 \times 1}$) with the kernel size of 1×1, the BN layer, and the ReLU function. Finally, an attention map corresponding to a spatial domain stream at the $t^{th}$ layer and an attention map corresponding to a frequency domain stream at the $t^{th}$ layer, namely, a spatial-domain attention map $A_1^t$ and a frequency-domain attention map $A_2^t$, are obtained by using the convolutional layer ($Conv_{3 \times 3}$) with 3×3 and the Sigmoid function. Then, the fused spatial-domain feature at the $t^{th}$ layer is generated based on the fused spatial-domain feature at the $(t-1)^{th}$ layer and the spatial-domain attention map at the $t^{th}$ layer.

For example, the computer device may weight the fused spatial-domain feature at the $(t-1)^{th}$ layer through a weight of the fused spatial-domain feature at the $t^{th}$ layer indicated by the spatial-domain attention map at the $t^{th}$ layer, to obtain the fused spatial-domain feature at the $t^{th}$ layer; and correspondingly generate the fused frequency-domain feature at the $t^{th}$ layer based on the fused frequency-domain feature at the $(t-1)^{th}$ layer and the frequency-domain attention map at the $t^{th}$ layer.

The computer device may weight the fused frequency-domain feature at the $(t-1)^{th}$ layer through a weight of the fused frequency-domain feature at the $t^{th}$ layer indicated by the frequency-domain attention map at the $t^{th}$ layer, to obtain the fused frequency-domain feature at the $t^{th}$ layer.

Step 580. Perform local region similarity extraction on the fused feature of the target facial image, to obtain a local region similarity set corresponding to the target facial image.

In a possible implementation, the fused feature of the target facial image is represented as a fused feature map.

The computer device performs region division on the fused feature map corresponding to the fused feature of the target facial image, to obtain at least two regions corresponding to the fused feature map; obtains feature vectors of the at least two regions; extracts a set of cosine distances between the feature vector of each of the at least two regions and the feature vector of another of the regions; and obtains the set of cosine distances of the at least two regions as the local region similarity set corresponding to the target facial image.

Exemplarily, assuming that a size of an outputted fused feature map is 20*20*512 (a width, a height, a number of channels), the fused feature map is divided into 5*5 local regions of 4*4*512, and then 4*4*512 feature vectors in each region is expanded into one-dimensional vectors by row or column, cosine distances between regions may be calculated based on the corresponding one-dimensional vectors in the 5*5 regions.

A quantity of regions for region division of the fused feature map is consistent with a quantity of regions for region division of a forged facial region image when calculating a real local region similarity of the forged facial region image.

That is, if the forged facial region image is divided into 5*5 regions, when the fused feature map is divided, the fused feature map is also divided into 5*5 regions.

A larger local region similarity between two local regions may indicate a smaller forged possibility in the local regions, and a smaller local region similarity between two local regions may indicate a larger forged possibility in the local regions.

In a possible implementation, the computer device may obtain a local region similarity between local regions by using a Mahalanobis distance or another measurement manner. The manner of obtaining the local region similarity is not limited in this disclosure.

Step 590. Obtain a detection result of the target facial image based on the local region similarity set, the detection result being used for indicating whether the target facial image is a forged facial image. For example, a detection result of the facial image is obtained based on the fused feature, the detection result indicating whether the facial image is a forged facial image.

In a possible implementation, the computer device inputs the local region similarity set into a forged facial image determining network of the facial image detection model, to obtain a forged facial image probability corresponding to the target facial image outputted by the forged facial image determining network; and determines whether the target facial image is a forged facial image based on the forged facial image probability.

The facial image detection model may be obtained by training the facial image sample and the facial image sample label corresponding to the facial image sample.

The forged facial image probability indicates a probability that the target facial image belongs to a forged face.

That is, a larger forged facial image probability indicates a larger probability that the target facial image belongs to a forged face, and a smaller forged facial image probability indicates a smaller probability that the target facial image belongs to a forged face.

In a possible implementation, the computer device may set a local region similarity threshold, count a quantity of local regions whose local region similarities are greater than the local region similarity threshold based on local region similarities of regions, and obtain the forged facial image probability of the target facial image based on the quantity of local regions whose local region similarities are greater than the local region similarity threshold.

The local region similarity threshold may be a manually adjusted value, or may be a value obtained after parameter adjustment during model training.

In a possible implementation, after the forged facial image probability of the target facial image is obtained, the detection result of the target facial image is outputted based on the forged facial image probability, that is, the target facial image is a real facial image, or is a forged facial image.

In a possible implementation, to make the detection result of the facial image explainable, a forged facial region corresponding to the target facial image is obtained based on the fused feature of the target facial image in response to the target facial image being a forged facial image.

The process may be implemented as follows: the fused feature of the target facial image is inputted into the decoder of the facial image detection model, to obtain the forged facial region image of the target facial image outputted by the decoder. The decoder may be formed by a plurality of up-sampling layers and a convolutional layer with a kernel size of 3×3.

When a detection object inputted into the facial image detection model is a facial video, facial image detection is performed based on at least two facial images obtained from the facial video, and a detection result of the facial video is outputted based on detection results of the facial images.

For example, in response to the detection result indicating, in the at least two facial images, that a quantity of forged facial images exceeds a specified threshold of a total quantity of detected facial images, the facial video is determined as a forged facial video.

In summary, according to the facial image detection model training and facial image detection method provided in this embodiment of this disclosure, a facial image detection model including an attention fusion network, a forged facial image determining network, and a decoder is obtained based on an image sample set. In this way, in a process of detecting a facial image, a fused feature of a target facial image can be obtained according to feature information of the target facial image on a spatial domain and a frequency domain, and forged facial recognition can be performed on the target facial image based on the fused feature. In this way, in the process of detecting the facial image, the features of the image on the spatial domain and the frequency domain are comprehensively considered, and the feature information of the two is also fused to obtain the fused feature of the facial image, so that the obtained fused feature of the target facial image is more accurate, and then a detection result of the target facial image obtained by using the fused feature is more accurate.

Figure 8:
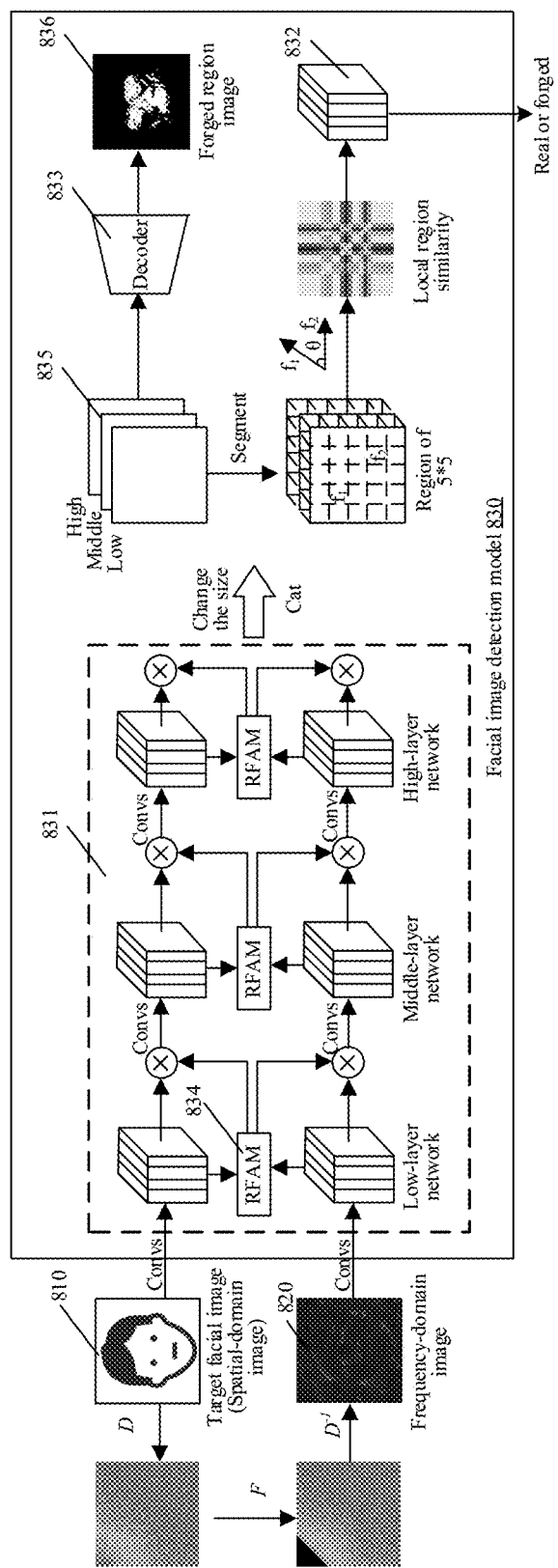
FIG. 8 is a schematic diagram of a process of detecting a facial image according to an exemplary embodiment of this disclosure.

By using an example in which the solutions shown in the above method embodiments are applied to a scenario of network friend making, in the scenario of network friend making, after a facial image sent by a friend is obtained, a user may verify authenticity of the facial image sent by the friend based on the facial image detection method provided in this disclosure. FIG. 8 is a schematic diagram of a process of facial image detection according to an exemplary embodiment of this disclosure. As shown in FIG. 8, after a target facial image 810 (that is, a facial image sent by a friend that is received by a user) is obtained, the user inputs the target facial image 810 into a facial image detection device (hereinafter referred to as a computer device). The computer device obtains a frequency-domain image 820 of the target facial image 810 through a frequency-domain transformation method, where the frequency-domain transformation method is represented as: converting the inputted facial image into frequency-domain space through discrete cosine transformation (D), filtering (F) low-frequency information of the image, and then transforming back into an image that is easy to train a convolutional neural network by inverse discrete cosine transformation ($D^{-1}$), namely, the frequency-domain image 820. After, the computer device inputs the frequency-domain image 820 of the target facial image 810 into a facial image detection model 830, where the facial image detection model includes: an attention fusion network 831, a forged facial image determining network 832, and a decoder 833. The facial image detection model 830 firstly extracts a spatial-domain feature and a frequency-domain feature of the target facial image synchronously based on the frequency-domain image 820 of the inputted target facial image 810. The computer device inputs the spatial-domain feature and the frequency-domain feature of the target facial image into the attention fusion network 831; fuses the spatial-domain feature and the frequency-domain feature at different layers based on an attention extraction subnetwork 834 in the attention fusion network 831, to obtain a fused feature 835 corresponding to the target facial image; performs a local region similarity calculation on the fused feature corresponding to the target facial image, to obtain a local region similarity set corresponding to the target facial image; and inputs the local region similarity set into the forged facial image determining network 832, to obtain a detection result of the target facial image outputted by the forged facial image determining network 832, that is, determines that the target facial image is a real facial image or the target facial image is a forged facial image, thereby feeding back to the user whether the image sent by the friend is real. To make the detection result of the facial image detection model explainable, the computer device inputs the fused feature 835 of the target facial image into the decoder 833, to obtain a forged facial region image 836 corresponding to the target facial image outputted by the decoder, and feeds back the forged facial region image to the user, for example, labels a forged region on the target facial image.

The above solutions shown in FIG. 8 are only described by using an application in the scenario of network friend making as an example. In addition, the above solutions may also be applied to any other scenario in which authenticity of a facial image needs to be verified. The application scenarios of the above solutions are not limited in this disclosure.

Figure 9:
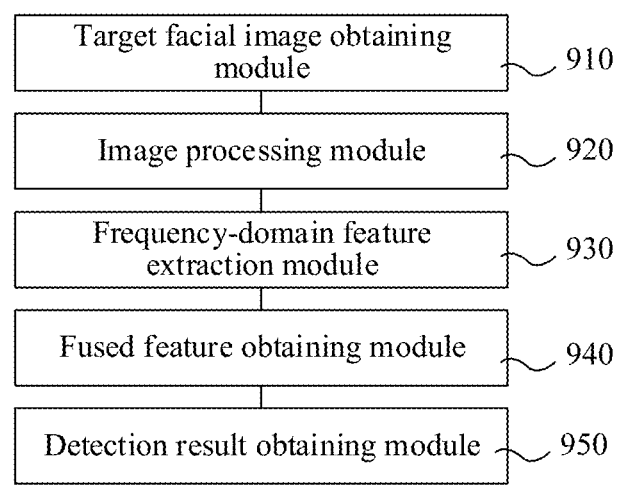
FIG. 9 is a block diagram of an image detection apparatus according to an exemplary embodiment of this disclosure.

FIG. 9 is a block diagram of an image detection apparatus according to an exemplary embodiment of this disclosure. The apparatus is used in a computer device. The image detection apparatus includes:

a target facial image obtaining module 910, configured to obtain a target facial image;

an image processing module 920, configured to obtain a frequency-domain image of the target facial image and a spatial-domain feature of the target facial image based on the target facial image, the frequency-domain image being an image obtained by performing frequency-domain transformation on the target facial image, and the spatial-domain feature being a feature obtained by performing feature extraction on the target facial image;

a frequency-domain feature extraction module 930, configured to perform feature extraction based on the frequency-domain image, to obtain a frequency-domain feature of the target facial image;

a fused feature obtaining module 940, configured to fuse the spatial-domain feature and the frequency-domain feature, to obtain a fused feature of the target facial image; and a detection result obtaining module 950, configured to obtain a detection result of the target facial image based on the fused feature of the target facial image, the detection result being used for indicating whether the target facial image is a forged facial image.

In a possible implementation, the fused feature obtaining module 940 is configured to perform attention mechanism-based fusion on the spatial-domain feature and the frequency-domain feature by using an attention fusion network of a facial image detection model, to obtain the fused feature of the target facial image, where the facial image detection model is obtained by training a facial image sample and a facial image sample label corresponding to the facial image sample.

In a possible implementation, the fused feature obtaining module 940 includes:

a feature fusion submodule, configured to perform, by the attention fusion network, attention mechanism-based fusion on the spatial-domain feature and the frequency-domain feature at n layers, to obtain intermediate fused features respectively corresponding to the n layers, where n is a positive integer; and a feature splicing submodule, configured to splice the intermediate fused features respectively corresponding to the n layers, to obtain the fused feature of the target facial image.

In a possible implementation, an intermediate fused feature is obtained based on a fused spatial-domain feature and a fused frequency-domain feature; and the fused spatial-domain feature is a feature on a spatial domain obtained after performing attention mechanism-based fusion on the spatial-domain feature and the frequency-domain feature, and the fused frequency-domain feature is a feature on a frequency domain obtained after performing attention mechanism-based fusion on the spatial-domain feature and the frequency-domain feature; and the feature fusion submodule includes:

a fused feature obtaining unit, configured to input, at a $t^{th}$ layer, a fused spatial-domain feature at a $(t-1)^{th}$ layer and a fused frequency-domain feature at the $(t-1)^{th}$ layer into the attention fusion network, to obtain a fused spatial-domain feature at the $t^{th}$ layer and a fused frequency-domain feature at the $t^{th}$ layer; and a fused feature splicing unit, configured to splice the fused spatial-domain feature at the $t^{th}$ layer and the fused frequency-domain feature at the $t^{th}$ layer, to generate an intermediate fused feature corresponding to the $t^{th}$ layer, where the $t^{th}$ layer is any one of the n layers, $1 \leq t \leq n$, and both t and n are a positive integer.

In a possible implementation, the fused feature obtaining unit includes:

an attention map obtaining subunit, configured to input, at the $t^{th}$ layer, the fused spatial-domain feature at the $(t-1)^{th}$ layer and the fused frequency-domain feature at the $(t-1)^{th}$ layer into an attention extraction subnetwork of the attention fusion network, to obtain a spatial-domain attention map at the $t^{th}$ layer and a frequency-domain attention map at the $t^{th}$ layer that are outputted by the attention extraction subnetwork, where the spatial-domain attention map is used for indicating a weight of the fused spatial-domain feature; and the frequency-domain attention map is used for indicating a weight of the fused frequency-domain feature;

a fused spatial-domain feature obtaining subunit, configured to generate the fused spatial-domain feature at the $t^{th}$ layer based on the fused spatial-domain feature at the $(t-1)^{th}$ layer and the spatial-domain attention map at the $t^{th}$ layer; and a fused frequency-domain feature obtaining subunit, configured to generate the fused frequency-domain feature at the $t^{th}$ layer based on the fused frequency-domain feature at the $(t-1)^{th}$ layer and the frequency-domain attention map at the $t^{th}$ layer.

In a possible implementation, the detection result obtaining module 950 includes:

a similarity set obtaining submodule, configured to perform local region similarity extraction on the fused feature of the target facial image, to obtain a local region similarity set corresponding to the target facial image; and a detection result obtaining submodule, configured to obtain the detection result of the target facial image based on the local region similarity set.

In a possible implementation, the detection result obtaining submodule includes:

a forged probability obtaining unit, configured to input the local region similarity set into a forged facial image determining network of a facial image detection model, to obtain a forged facial image probability corresponding to the target facial image outputted by the forged facial image determining network; and a forged facial image determining unit, configured to determine whether the target facial image is a forged facial image based on the forged facial image probability, where the facial image detection model is obtained by training a facial image sample and a facial image sample label corresponding to the facial image sample.

In a possible implementation, the apparatus further includes:

a forged facial region obtaining module, configured to obtain, in response to the target facial image being a forged facial image, a forged facial region corresponding to the target facial image based on the fused feature of the target facial image.

In summary, according to the image detection apparatus provided in this embodiment of this disclosure, feature information of a target facial image on a spatial domain and a frequency domain is obtained, a fused feature of the target facial image is obtained according to the feature information of the target facial image on the spatial domain and the frequency domain, and forged facial recognition is performed on the target facial image based on the fused feature. In this way, in a process of detecting the facial image, features of the image on the spatial domain and the frequency domain are comprehensively considered, and the feature information of the two is also fused to obtain the fused feature of the facial image, so that the obtained fused feature of the target facial image is more accurate, and then a detection result of the target facial image obtained by using the fused feature is more accurate.

Figure 10:
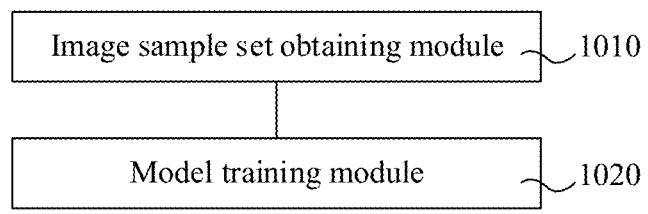
FIG. 10 is a block diagram of a model training apparatus according to an exemplary embodiment of this disclosure.

FIG. 10 is a block diagram of a facial model training apparatus according to an exemplary embodiment of this disclosure. The apparatus is used in a computer device. A facial image detection model includes: an attention fusion network, a forged facial image determining network, and a decoder, the attention fusion network being configured to obtain a fused feature of a facial image based on a spatial-domain feature and a frequency-domain feature of the facial image. The model training apparatus includes:

an image sample set obtaining module 1010, configured to obtain an image sample set, the image sample set including at least two facial image sample pairs, each of the facial image sample pairs including a facial image positive sample and a facial image negative sample, each of the facial image samples having a corresponding facial image sample label, and the facial image sample label including a real facial label and a forged facial label; and a model training module 1020, configured to train the facial image detection model by using the image sample set, the facial image detection model being configured to perform the following operations: obtaining a target facial image; performing frequency-domain transformation on the target facial image, to obtain a frequency-domain image of the target facial image; performing feature extraction based on the target facial image, to obtain a spatial-domain feature of the target facial image; performing feature extraction based on the frequency-domain image, to obtain a frequency-domain feature of the target facial image; fusing the spatial-domain feature and the frequency-domain feature, to obtain a fused feature of the target facial image; and obtaining a detection result of the target facial image based on the fused feature of the target facial image, the detection result being used for indicating whether the target facial image is a forged facial image.

In a possible implementation, the model training module 1020 includes:

a forged facial region image obtaining submodule, configured to obtain, based on the at least two facial image sample pairs in the image sample set, forged facial region images corresponding to each of the facial image sample pairs;

a similarity set obtaining submodule, configured to obtain a real local region similarity set of each of the forged facial region images; and a model training submodule, configured to train the facial image detection model based on the facial image samples and a training label corresponding to each of the facial image samples, where the training label includes the facial image sample label, the forged facial region image, and the real local region similarity set of the forged facial region image.

In a possible implementation, the model training submodule includes:

a prediction result obtaining unit, configured to input each of the facial image samples into the facial image detection model, to obtain a prediction result corresponding to each of the facial image samples, where the prediction result includes a predicted facial image sample label, a predicted forged facial region image, and a predicted local region similarity;

a loss function calculation unit, configured to calculate a loss function based on the training labels corresponding to the facial image samples and the prediction results corresponding to the facial image samples; and a model parameter updating unit, configured to perform parameter updating on the facial image detection model based on the loss function.

In summary, according to the facial image detection model training apparatus provided in this embodiment of this disclosure, a facial image detection model including an attention fusion network, a forged facial image determining network, and a decoder is obtained based on training an image sample set. In this way, in a process of detecting a facial image, features of the facial image on a spatial domain and a frequency domain are comprehensively considered by using the facial image detection model, and feature information of the two is also fused to obtain a fused feature of the facial image, so that the obtained fused feature of a target facial image is more accurate, and then a detection result of the target facial image obtained by using the fused feature is more accurate.

Figure 11:
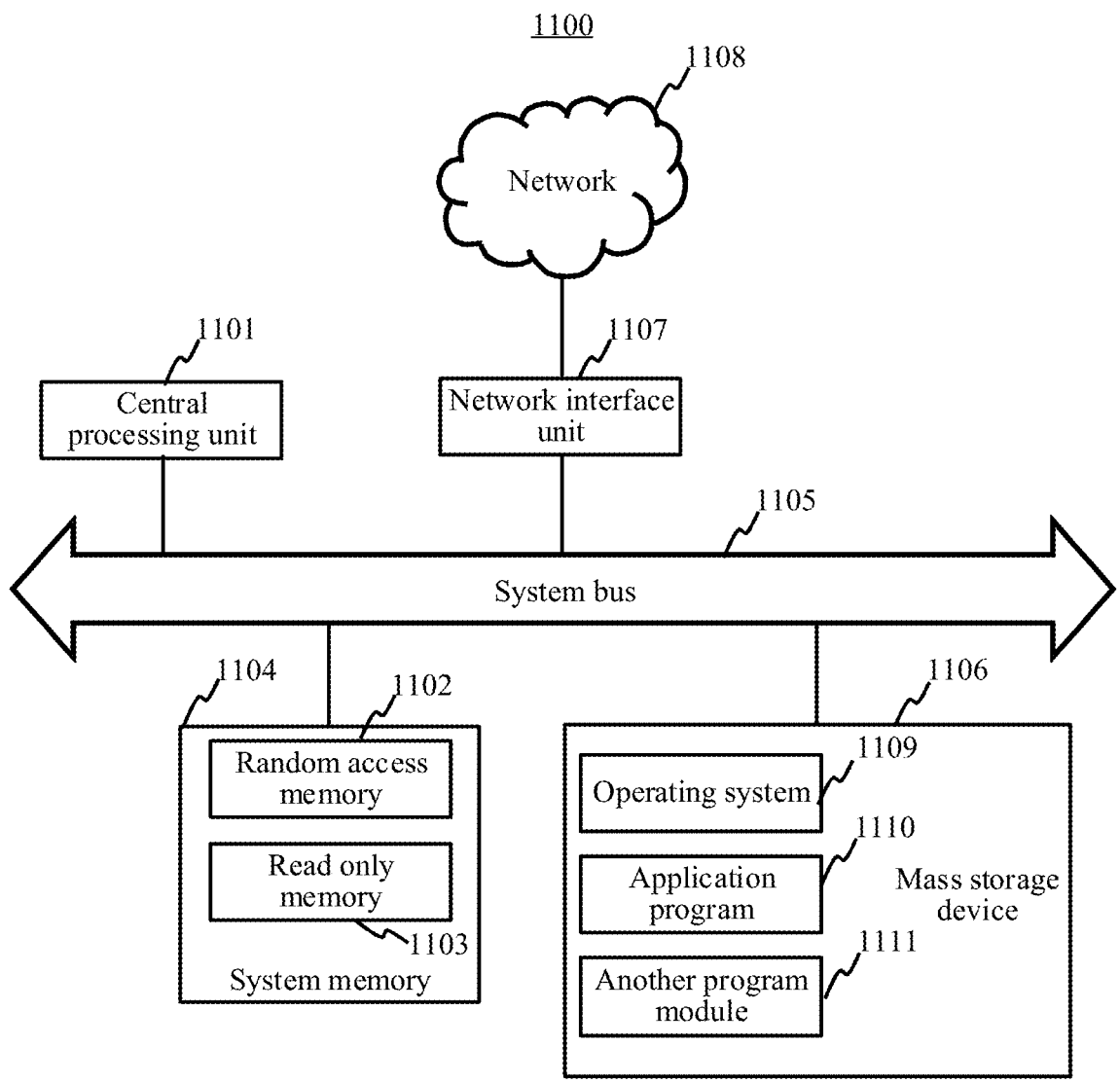
FIG. 11 is a structural block diagram of a computer device according to an exemplary embodiment of this disclosure.

FIG. 11 is a structural block diagram of a computer device 1100 according to an exemplary embodiment of this disclosure. The computer device may be implemented as a server in the above solutions in this disclosure. The computer device 1100 includes a central processing unit (CPU) 1101, a system memory 1104 including a random access memory (RAM) 1102 and a read-only memory (ROM) 1103, and a system bus 1105 connecting the system memory 1104 to the CPU 1101. The computer device 1100 further includes a mass storage device 1106 configured to store an operating system 1109, an application program 1110, and another program module 1111.

The mass storage device 1106 is connected to the CPU 1101 by using a mass storage controller (not shown) connected to the system bus 1105. The mass storage device 1106 and an associated computer-readable medium provide non-volatile storage for the computer device 1100. That is, the mass storage device 1106 may include a computer-readable medium (not shown) such as a hard disk or a compact disc ROM (CD-ROM) drive.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The system memory 1104 and the mass storage device 1106 may be collectively referred to as a memory.

According to the embodiments of this disclosure, the computer device 1100 may further be connected, through a network such as the Internet, to a remote computer on the network. That is, the computer device 1100 may be connected to a network 1108 by using a network interface unit 1107 connected to the system bus 1105, or may be connected to another type of network or a remote computer system (not shown) by using a network interface unit 1107.

The memory further includes at least one instruction, at least one program, and a code set or an instruction set, and the at least one instruction, the at least one program, and the code set or the instruction set is stored in the memory, and through performing the at least one instruction, the at least one program, and the code set or the instruction set, the CPU 1101 implements all or some steps of the image detection method in the above embodiments.

Figure 12:
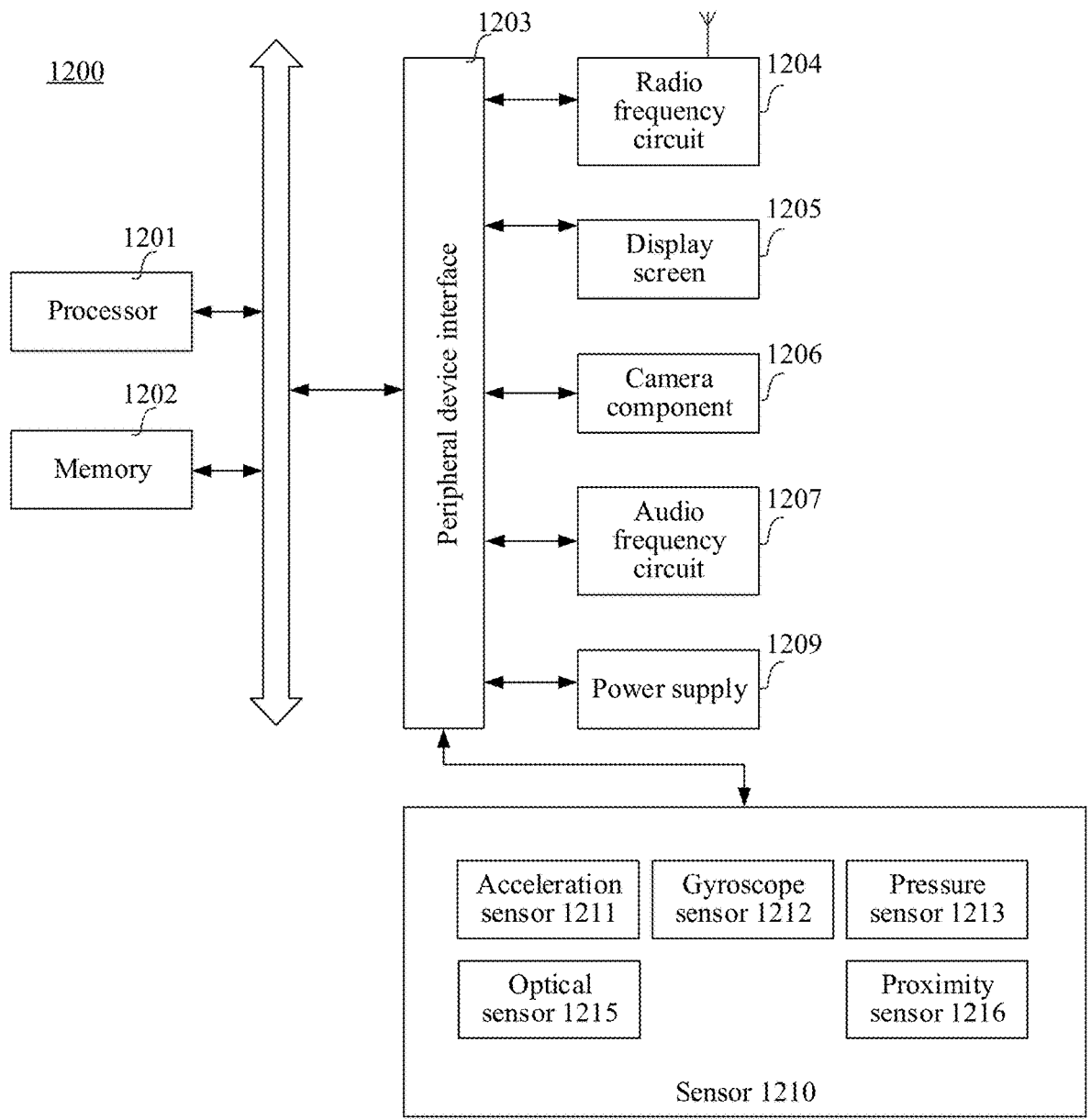
FIG. 12 is a structural block diagram of a computer device according to an exemplary embodiment of this disclosure.

FIG. 12 is a structural block diagram of a computer device 1200 according to an exemplary embodiment of this disclosure. The computer device 1200 may be implemented as the above facial image detection device and/or facial image detection model training device, such as a smartphone, a tablet computer, a notebook computer, or a desktop computer. The computer device 1200 may be further referred to as another name such as user equipment, a portable terminal, a laptop terminal, or a desktop terminal.

Generally, the computer device 1200 includes a processor 1201 (including processing circuitry) and a memory 1202 (including a non-transitory computer-readable storage medium).

The processor 1201 may include one or more processing cores. For example, the processor 1201 may be a 4-core processor or a 12-core processor. The processor 1201 may be implemented by using at least one hardware form of a digital signal processor (DSP), a field-programmable gate array (FPGA), and a programmable logic array (PLA). The processor 1201 may alternatively include a main processor and a coprocessor. The main processor is configured to process data in an active state, also referred to as a CPU. The coprocessor is a low-power processor configured to process data in a standby state. In some embodiments, the processor 1201 may be integrated with a graphics processing unit (GPU). The GPU is configured to render and draw content that needs to be displayed on a display. In some embodiments, the processor 1201 may further include an artificial intelligence (AI) processor. The AI processor is configured to process computing operations related to machine learning.

The memory 1202 may include one or more computer-readable storage media. The computer-readable storage media may be non-transient. The memory 1202 may further include a high-speed random access memory, and a non-volatile memory such as one or more magnetic disk storage devices and a flash storage device. In some embodiments, a non-transitory computer-readable storage medium in the memory 1202 is configured to store at least one instruction, the at least one instruction being configured to be executed by the processor 1201 to implement the facial image detection method and the model training method provided in the method embodiments of this disclosure.

In some embodiments, the computer device 1200 further includes a peripheral device interface 1203 and at least one peripheral device. The processor 1201, the memory 1202, and the peripheral device interface 1203 may be connected by using a bus or a signal cable. Each peripheral device may be connected to the peripheral device interface 1203 by using a bus, a signal line, or a circuit board. Specifically, the peripheral device includes: at least one of a radio frequency (RF) circuit 1204, a display screen 1205, a camera component 1206, an audio circuit 1207, and a power supply 1209.

The peripheral device interface 1203 may be configured to connect at least one input/output (I/O)-related peripheral device to the processor 1201 and the memory 1202. In some embodiments, the processor 1201, the memory 1202, and the peripheral device interface 1203 are integrated on the same chip or the same circuit board. In some other embodiments, any or both of the processor 1201, the memory 1202, and the peripheral device interface 1203 may be implemented on an independent chip or circuit board, which is not limited in this embodiment.

In some embodiments, the computer device 1200 may also include one or more sensors 1210. The one or more sensors 1210 include, but are not limited to: an acceleration sensor 1211, a gyroscope sensor 1212, a pressure sensor 1213, an optical sensor 1215, and a proximity sensor 1216.

A person skilled in the art may understand that the structure shown in FIG. 12 does not constitute any limitation on the computer device 1200, and the computer device may include more components or fewer components than those shown in the figure, or some components may be combined, or a different component deployment may be used.

In an exemplary embodiment, a computer-readable storage medium is further provided, and is configured to store at least one instruction, at least one program, a code set or an instruction set, the at least one instruction, the at least one program, the code set or the instruction set being loaded and executed by a processor to implement all or some of the steps of the above image detection method and/or model training method. For example, the computer-readable storage medium may be a read-only memory (ROM), a random access memory (random-access memory, RAM), a compact disc read-only memory (CD-ROM), a magnetic tape, a floppy disk, an optical data storage device, and the like.

In an embodiment, a non-transitory computer-readable storage medium stores computer-readable instructions which, when executed by a computer device, cause the computer device to perform an image detection method that includes obtaining a facial image, and obtaining a frequency-domain image of the facial image and a spatial-domain feature of the facial image, the frequency-domain image being obtained by performing frequency-domain transformation on the facial image. The spatial-domain feature is obtained by performing feature extraction on the facial image. The method further includes performing feature extraction based on the frequency-domain image, to obtain a frequency-domain feature of the facial image, and fusing the spatial-domain feature and the frequency-domain feature by using an attention fusion network of a facial image detection model, to obtain a fused feature of the facial image. The method further includes obtaining a detection result of the facial image based on the fused feature, the detection result indicating whether the facial image is a forged facial image.

In an embodiment, a non-transitory computer-readable storage medium stores computer-readable instructions which, when executed by a computer device, cause the computer device to perform a model training method includes training a facial image detection model including an attention fusion network, a forged facial image determining network, and a decoder, the attention fusion network being configured to generate a fused feature of a facial image based on a spatial-domain feature and a frequency-domain feature of the facial image. The method includes obtaining an image sample set, the image sample set including at least two facial image sample pairs, each of the facial image sample pairs including a facial image positive sample and a facial image negative sample. Each of the facial image samples has a corresponding facial image sample label, and the facial image sample label includes a real facial label or a forged facial label. The method further includes training the facial image detection model by using the image sample set, where the facial image detection model is configured to obtain the facial image, and perform frequency-domain transformation on the facial image, to obtain a frequency-domain image of the facial image. The facial image detection model is further configured to perform feature extraction based on the facial image, to obtain the spatial-domain feature of the facial image, and perform feature extraction based on the frequency-domain image, to obtain the frequency-domain feature of the facial image. The facial image detection model is further configured to fuse the spatial-domain feature and the frequency-domain feature by using the attention fusion network, to obtain the fused feature of the facial image, and obtain a detection result of the facial image based on the fused feature, the detection result indicating whether the facial image is a forged facial image.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An image detection method, comprising:
   obtaining a facial image;
   obtaining a frequency-domain image of the facial image and a spatial-domain feature of the facial image, the frequency-domain image being obtained by performing frequency-domain transformation on the facial image, and the spatial-domain feature being obtained by performing feature extraction on the facial image;
   performing feature extraction based on the frequency-domain image, to obtain a frequency-domain feature of the facial image;
   fusing the spatial-domain feature and the frequency-domain feature by using an attention fusion network of a facial image detection model, to obtain a fused feature of the facial image; and
   obtaining a detection result of the facial image based on the fused feature, the detection result indicating whether the facial image is a forged facial image.

2. The method according to claim 1, wherein the fusing comprises:
   performing attention mechanism-based fusion on the spatial-domain feature and the frequency-domain feature by using the attention fusion network of the facial image detection model, to obtain the fused feature of the facial image, wherein
   the facial image detection model is trained using a facial image sample and a facial image sample label corresponding to the facial image sample.

3. The method according to claim 2, wherein the performing the attention mechanism-based fusion comprises:
   performing, by using the attention fusion network, attention mechanism-based fusion on the spatial-domain feature and the frequency-domain feature at n layers, to obtain intermediate fused features respectively corresponding to the n layers, wherein n is a positive integer; and
   splicing the intermediate fused features respectively corresponding to the n layers, to obtain the fused feature of the facial image.

4. The method according to claim 3, wherein
   an intermediate fused feature is obtained based on a fused spatial-domain feature and a fused frequency-domain feature; and
   the fused spatial-domain feature is a feature in a spatial domain obtained after performing attention mechanism-based fusion on the spatial-domain feature and the frequency-domain feature, and the fused frequency-domain feature is a feature in a frequency domain obtained after performing attention mechanism-based fusion on the spatial-domain feature and the frequency-domain feature.

5. The method according to claim 4, further comprising generating the fused spatial-domain feature and the fused frequency-domain feature by the attention fusion network based on a fused spatial-domain feature at a previous layer and a fused frequency-domain feature at the previous layer.

6. The method according to claim 1, wherein the obtaining the detection result comprises:
performing local region similarity extraction on the fused feature, to obtain a local region similarity set corresponding to the facial image; and
obtaining the detection result of the facial image based on the local region similarity set.

7. The method according to claim 6, wherein the obtaining the detection result comprises:
inputting the local region similarity set into a forged facial image determining network of the facial image detection model, to obtain a forged facial image probability corresponding to the facial image; and
determining whether the facial image is a forged facial image based on the forged facial image probability, wherein
the facial image detection model is obtained by training a facial image sample and a facial image sample label corresponding to the facial image sample.

8. The method according to claim 1, further comprising:
obtaining, in response to a determination that the facial image is a forged facial image, a forged facial region in the facial image based on the fused feature of the facial image.

9. A model training method of training a facial image detection model comprising an attention fusion network, a forged facial image determining network, and a decoder, the attention fusion network being configured to generate a fused feature of a facial image based on a spatial-domain feature and a frequency-domain feature of the facial image, the method comprising:
obtaining an image sample set, the image sample set comprising at least two facial image sample pairs, each of the facial image sample pairs comprising a facial image positive sample and a facial image negative sample, each of the facial image samples having a corresponding facial image sample label, and the facial image sample label comprising a real facial label or a forged facial label; and
training the facial image detection model by using at least one image in the image sample set, including
performing frequency-domain transformation on the at least one image of the image sample set, to obtain a frequency-domain image of the at least one image of the image sample set;
performing feature extraction based on the at least one image of the image sample set, to obtain the spatial-domain feature of the at least one image of the image sample set;
performing feature extraction based on the frequency-domain image, to obtain the frequency-domain feature of the at least one image of the image sample set;
fusing the spatial-domain feature and the frequency-domain feature by using the attention fusion network, to obtain the fused feature of the at least one image of the image sample set; and
obtaining a detection result of the at least one image of the image sample set based on the fused feature, the detection result indicating whether the at least one image of the image sample set is a forged facial image.

10. The method according to claim 9, wherein the training the facial image detection model by using the image sample set comprises:
obtaining, based on the at least two facial image sample pairs in the image sample set, forged facial region images corresponding to each of the facial image sample pairs;
obtaining a real local region similarity set of each of the forged facial region images; and
training the facial image detection model based on the facial image sample pairs and a training label corresponding to each of the facial image sample pairs, wherein the training label comprises the facial image sample labels, the forged facial region image, and the real local region similarity set of the forged facial region image.

11. The method according to claim 10, wherein the training the facial image detection model based on the facial image sample pairs and a training label comprises:
inputting each of the facial image samples into the facial image detection model, to obtain a prediction result corresponding to each of the facial image samples, wherein the prediction result comprises a predicted facial image sample label, a predicted forged facial region image, and a predicted local region similarity;
calculating a loss function based on the training labels corresponding to the facial image samples and the prediction results corresponding to the facial image samples; and
performing parameter updating on the facial image detection model based on the loss function.

12. An image detection apparatus, comprising:
processing circuitry configured to
obtain a facial image;
obtain a frequency-domain image of the facial image and a spatial-domain feature of the facial image, the frequency-domain image being obtained by performing frequency-domain transformation on the facial image, and the spatial-domain feature being obtained by performing feature extraction on the facial image;
perform feature extraction based on the frequency-domain image, to obtain a frequency-domain feature of the facial image;
fuse the spatial-domain feature and the frequency-domain feature by using an attention fusion network of a facial image detection model, to obtain a fused feature of the facial image; and
obtain a detection result of the facial image based on the fused feature, the detection result indicating whether the facial image is a forged facial image.

13. The apparatus according to claim 12, wherein the processing circuitry is further configured to:
perform attention mechanism-based fusion on the spatial-domain feature and the frequency-domain feature by using the attention fusion network, to obtain the fused feature of the facial image, wherein
the facial image detection model is obtained by training a facial image sample and a facial image sample label corresponding to the facial image sample.

14. The apparatus according to claim 13, wherein the processing circuitry is further configured to:
perform, by the attention fusion network, attention mechanism-based fusion on the spatial-domain feature and the frequency-domain feature at n layers, to obtain intermediate fused features respectively corresponding to the n layers, wherein n is a positive integer; and splice the intermediate fused features respectively corresponding to the n layers, to obtain the fused feature of the facial image.

15. The apparatus according to claim 14, wherein an intermediate fused feature is obtained based on a fused spatial-domain feature and a fused frequency-domain feature;

the fused spatial-domain feature is a feature on a spatial domain obtained after performing attention mechanism-based fusion on the spatial-domain feature and the frequency-domain feature, and the fused frequency-domain feature is a feature on a frequency domain obtained after performing attention mechanism-based fusion on the spatial-domain feature and the frequency-domain feature.

16. The apparatus according to claim 15, wherein the processing circuitry is further configured to generate the fused spatial-domain feature and the fused frequency-domain feature by the attention fusion network based on a fused spatial-domain feature at a previous layer and a fused frequency-domain feature at the previous layer.

17. The apparatus according to claim 12, wherein the processing circuitry is further configured to:

perform local region similarity extraction on the fused feature, to obtain a local region similarity set corresponding to the facial image; and obtain the detection result of the facial image based on the local region similarity set.

18. The apparatus according to claim 17, wherein the processing circuitry is further configured to:

input the local region similarity set into a forged facial image determining network of the facial image detection model, to obtain a forged facial image probability corresponding to the facial image; and determine whether the facial image is a forged facial image based on the forged facial image probability, wherein the facial image detection model is trained using a facial image sample and a facial image sample label corresponding to the facial image sample.

19. The apparatus according to claim 12, wherein the processing circuitry is further configured to:

obtain, in response to the facial image being determined as a forged facial image, a forged facial region of the facial image based on the fused feature of the facial image.

* * * * *